Jan. 10, 1956  K. F. GALLIMORE ET AL  2,730,021
MACHINE TOOL

Filed Nov. 17, 1948  7 Sheets-Sheet 3

INVENTOR
Keith F. Gallimore
Garner H. Schurger
BY
Carlson, Pitzner, Halford & Wolfe
ATTORNEY

INVENTOR
Keith F. Gallimore
Garner H. Schurger
By Carlson, Pitzner, Hubbard & Wolfe
ATTORNEYS United States Patent Office 2,730,021
Patented Jan. 10, 1956

2,730,021

MACHINE TOOL

Keith F. Gallimore and Garner H. Schurger, Fond du Lac, Wis., assignors to Giddings & Lewis Machine Tool Company, Fond du Lac, Wis., a corporation of Wisconsin Application November 17, 1948, Serial No. 60,438

11 Claims. (Cl. 90—16)

The invention relates to improvements in machine tools and it has particular reference to an improved spindle headstock adapted for use especially in machine tools of the type commonly known as horizontal boring, drilling and milling machines.

One object of the invention is to provide an improved spindle headstock of the above general character in which various tools, tool fixtures and tool attachments to be driven by and translated axially with the spindle may be supported independently thereof and in a manner affording more rigid support for the tools and effectually eliminating lateral flexure of the spindle when operating in projected relation to the headstock, thereby enhancing the accuracy of the machining operations.

Another object is to provide a spindle headstock in which the supporting means may be selectively connected for joint translation with the spindle or disconnected and retracted to an out-of-the-way position to permit operation of the spindle in the conventional manner.

Another object is to provide a spindle headstock in which the supporting means may be translated jointly with or independently of the spindle, thus providing greater flexibility in operation and adapting the headstock for a wider variety of machining operations.

Another object is to provide supporting means in the form of an auxiliary support or underarm slidably guided in the headstock housing in parallel relation to the spindle, together with improved means for translating the spindle and the underarm in synchronism which allows the headstock housing to be effectually sealed against the leakage of oil therefrom.

Still another object is to provide a spindle headstock embodying novel means by which the spindle may be selectively connected for axial translation by the spindle driving ram or locked against movement while the ram is utilized for translating a companion element mounted on the headstock.

A further object is to provide a spindle headstock with an underarm slidable parallel to the spindle and adapted to support suitable tool holding fixtures for planing or shaping operations.

Other detailed objects reside in the provision of adjustable guide means for the underarm, improved means for clamping the underarm in selected positions of adjustment, and novel interlocking means for preventing inadvertent engagement of the drive for the underarm when the clamping means is applied.

Other objects and advantages of the invention will become apparent from the following detailed description of the preferred embodiment illustrated in the accompanying drawings, in which.

For purposes of illustration, the invention has been shown and will be described as incorporated in a spindle headstock of the type commonly employed in horizontal boring, drilling and milling machines. It will be understood, however, that this embodiment is merely illustrative and that the various features of the invention may be utilized with translatable spindles in orther forms of spindle headstocks as used in various types of machine tools.

The particular headstock illustrated comprises a housing 20 (Figs. 1 and 2) which is mounted for vertical adjustment or translation on a column 21 and which has journaled therein for rotary drive and projected axial translation a main spindle 22. To support the spindle 22 for both speed and feed drives, the forward end thereof extends through and is slidably splined for axial movement in a rotary drive quill 23 (Fig. 14) journaled in fixed endwise position within the housing 20. The rear end of the spindle 22 extends through a tubular feed ram 24 (Figs. 3, 10 and 11) and is provided with novel coupling means 25 operable selectively to couple the spindle to the ram for translation thereby or to disengage the spindle from the ram and lock it in a fixed position while freeing the ram for translation independently of the spindle. The ram 24 as shown is slidable in a ram guide 26 extending rearwardly from the housing 20.

Any suitable means may be provided for driving the quill 23 and hence the spindle 22 selectively at any one of a series of rotary speeds within a wide range. Means is also provided for translating the ram 24 axially either by power or manually, such means including in the present instance speed-change gearing 27 (Fig. 1) which may be set to facilitate manual translation of the ram and the spindle or other mechanism associated therewith. The specific means utilized for driving the spindle forms no part of the present invention and is therefore not disclosed in detail, but reference may be had to the Gallimore Patent No. 2,251,015 for drive means of a suitable character. In this organization, power for both speed and feed drives is derived from a common electric drive motor M mounted on the exterior of the housing 20.

In the particular headstock herein disclosed the spindle 22 is disposed in a substantially horizontal position and the front end is appropriately shaped for drive connection with a suitable tool, tool holding fixture or tool attachment. The spindle is adapted to be projected axially out of the headstock housing 20 either into any predetermined fixed extended position of adjustment or in a feeding translation within its range of axial movement. In the present instance the forward or nose end of the spindle is formed with a taper socket 30 (Fig. 14) adapted to receive a taper shank 31 for transmitting a rotary drive for the tool. In prior conventional constructions the shank would normally constitute the support of the tool.

It has also been common practice to mount various tool fixtures and attachments on the outer end of the quill 23 and to utilize the spindle 22 as an actuating member for some element of the fixture or attachment. With this arrangement, however, projection of the tool or tools of the attachment in a cutting translation or into the extended position axially of the spindle has been precluded because of the fixed support of the attachment on the quill. Consequently, spindle headstocks of the conventional type have not been adapted for such operations as planing and shaping through axial translation of the spindle. Moreover, the utility of such spindle headstocks for heavy milling operations has been limited by the inability to project the spindle sleeve so as to position the tool for operation upon surfaces lying in different vertical planes. Furthermore, milling operations with the cutters carried directly on the spindle have been restricted to the use of relatively small tools, due to the lack of sufficient rigidity in the spindle when projected a substantial distance from the headstock. Under such operating conditions the severe strains imposed on the spindle induce lateral flexures therein which seriously interfere with the performance of accurate or precision machining operations.

The present invention completely eliminates the above difficulties by providing outboard support for the tools, fixtures or attachments independently of the spindle while utilizing the latter for driving the tool in machining operations which require a rotative tool movement. The independent support thus provided for the tool also enables the headstock to be used for machining operations such as planing or shaping, in which the tool is traversed in a linear path without rotation. The utility of the headstock is thus extended and the more rigid support provided for the tools permits machining operations to be performed with a higher degree of precision.

In accordance with the invention, support for the tools, fixtures or attachments is provided by an auxiliary or outboard supporting member translatable parallel to and in synchronism with the spindle. In its preferred form the supporting member comprises an elongated arm 35 disposed in parallel relation to the spindle and slidably supported for longitudinal or endwise translation on the housing 20.

The arm 35 may be supported on any suitable portion in the housing 20, but preferably is mounted on the underside thereof so as to constitute an underarm adapted to be projected with the spindle and to extend in supporting position beneath the latter. In the preferred form shown, the arm 35 is rectangular in cross section and comprises side members 36 (Fig. 3), a bottom member 37 and a top member 38 suitably secured together to form a rigid box-type structure. Transverse ribs 39 extending between the members serve to increase the rigidity of the structure.

Figures 1, 2:
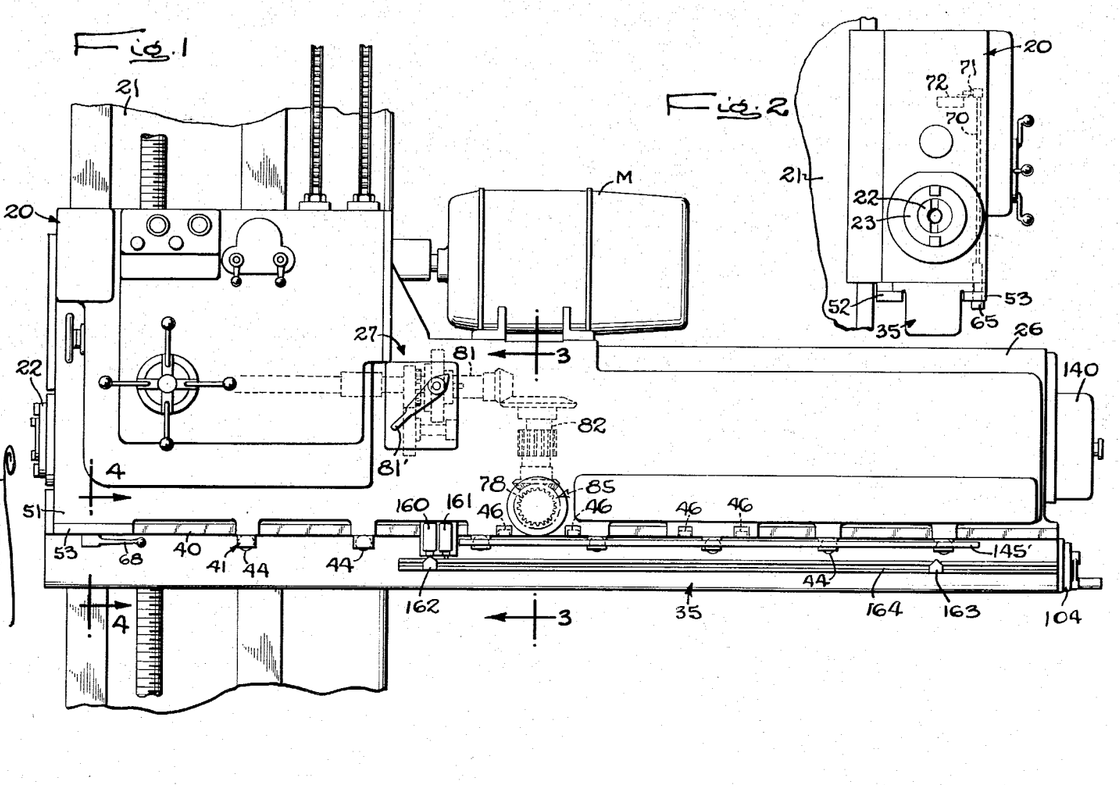
Figure 1 is a fragmentary, front elevational view of a horizontal boring, drilling and milling machine of the type disclosed in the patent to Keith F. Gallimore, No. 2,251,015, granted July 29, 1941, and having a spindle headstock embodying the features of the present invention.
Fig. 2 is an end elevational view of the headstock.

To provide support for the arm 35 on the housing 20 the top member 38 of the arm is extended at opposite sides to form longitudinal ways 40 (Figs 3, 4 and 8) adapted to cooperate with supporting and guiding means carried on the underside of the housing. In the present instance the ways 40 are supported and guided throughout the major portion of their length by roller bearing units 41 and 42. The bearing units 41 are alike in construction, each including a stub shaft 43 having a roller 44 journaled on antifriction bearings at its projecting ends. A series of the units 41 are secured to the underside of the housing 20 on opposite sides of the arm 35 and are spaced apart longitudinally thereof, as shown in Fig. 1, with the shafts 43 disposed horizontally and with the rollers 44 underlying the bottom way surfaces 45 of the ways 40 to form complemental antifriction guideways.

The bearing units 42 have rollers 46 (Fig. 8) journaled on vertically disposed shafts 47. A plurality of these units are also secured to the underside of the housing 20 on opposite sides of the arm 35 with the rollers 46 positioned to engage the vertical guiding surfaces 48 of the ways 40. The underarm is thus supported and guided for longitudinal movement parallel to the axis of the spindle 22.

To insure the highest degree of accuracy and to provide for taking up wear, the supporting and guiding action of the rollers 44 and 46 is supplemented by a slideway at the forward end of the headstock. For this purpose the headstock is formed with depending ribs 50 and 51 (Fig. 4) located on opposite sides of the arm 35 and extending longitudinally thereof. Bearing plates 52 and 53 of bronze or other suitable material are secured to the ribs so as to extend under the ways 40 to engage the guide surfaces 45. In the present instance the rib 50 is formed with a vertical guide surface 54 adapted for slidable engagement with the vertical face 48 of the adjacent way 40.

Figure 4:
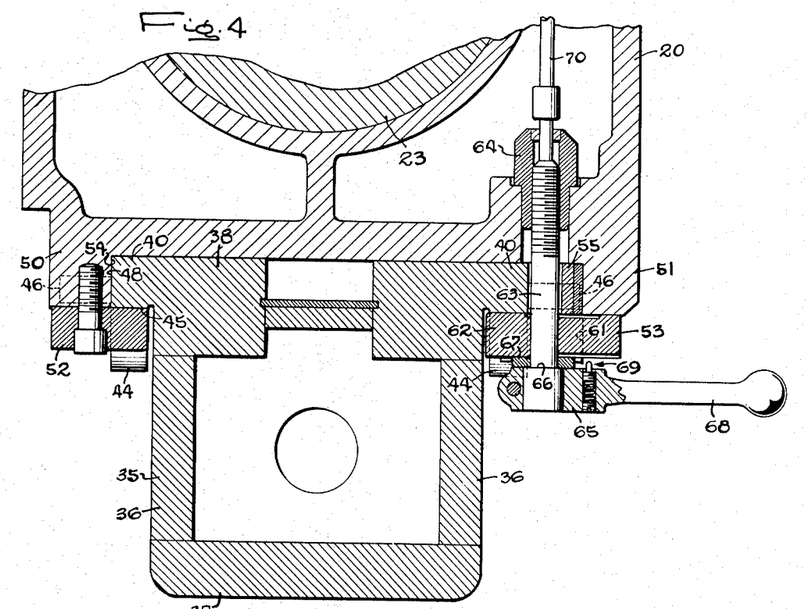
Fig. 4 is a fragmentary transverse sectional view of the headstock taken in a vertical plane susbtantially on the line 4—4 of Fig. 1.

To provide for taking up wear in the bearing surfaces the rib 51 is spaced substantially from the upright face of the adjacent way 40 as shown in Fig. 4. Mounted within this space is an elongated guide member 55 of bronze or the like having its vertically disposed face in sliding contact with the corresponding face of the way 40. The opposite face of the member 55 is inclined longitudinally for coaction with a complementally tapered gib 56 wedged between the member and the rib 51. By appropriate endwise adjustment of the gib and the member relative to each other, the member may be shifted into engagement with the way 40 so as to take up any wear in the bearing surfaces.

Figure 5:
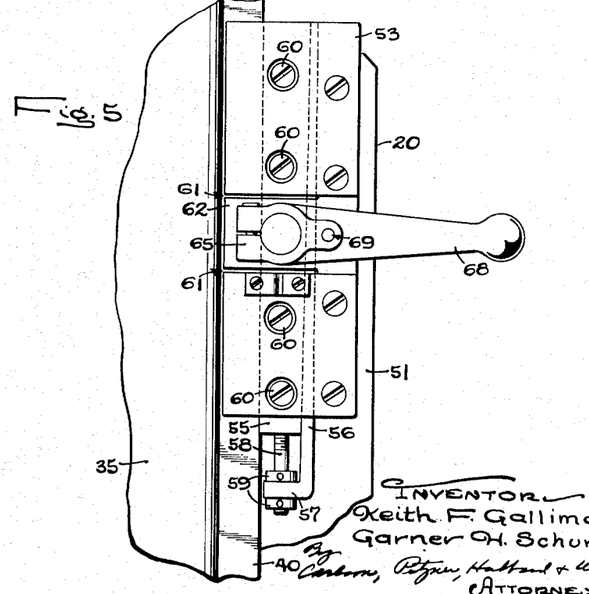
Fig. 5 is a bottom view of the underarm slideway and clamping mechanism.

The invention provides means of a simple yet effective character for relatively adjusting the guide member 55 and the gib 56. To this end the latter is formed with a lateral extension 57 (Fig. 5) adapted to project over but spaced from the inner end of the member 55. An adjusting screw 58 threaded into the inner end of the member projects longitudinally therefrom through a clearance hole in the extension 57 and is confined against endwise movement relative thereto by spaced abutment members 59 rigidly attached to the screw on opposite sides of the extension. By rotating the screw 58, the gib 57 is rendered effective to force the spacer 55 against the way 40.

To relieve the strain on the adjusting screw 58, provision is made for clamping the guide member 55 in the position to which it has been adjusted by the action of the gib 56. Such clamping is effected in the present instance by a series of clamping bolts 60 extending through suitable openings in the guide plate 53 and the member and threading into the housing 20.

To provide for clamping the arm 35 in fixed positions, the guide plate 53 is slotted transversely as at 61 (Fig. 5) to define a resilient tongue portion 62 adapted to be forced into clamping engagement with the underside of the way 40 by a clamping shaft 63. This shaft extends through an aperture in the tongue 62 and has its upper end threaded into a nut 64 (Fig. 4) non-rotatably anchored in the housing 20. The lower end of the shaft 63 is arranged to project below the tongue 62 and is formed with an enlarged head 65 defining a shoulder 66 in opposed relation to the tongue. A washer 67 interposed between the shoulder 66 and the tongue 62 serves to transmit a thrust from the shaft to the latter as the shaft is screwed into the nut 64.

To facilitate actuation of the clamping shaft, a handle 68 is non-rotatably fixed on its projecting end or the head portion 65. In the assembly of the machine the spacing of the nut 64 from the head 65 of the shaft is adjusted so that the clamping and releasing of the arm may be effected by rocking the handle 68 through an arc of approximately ninety degrees. Preferably the arrangement is such that the handle extends laterally from the headstock when the arm is clamped and lies parallel to the arm and in underlying relation to the headstock when the arm is free for traversing movement. A spring-pressed detent 69 mounted on the handle engaging in suitable indentations in the plate 53 is effective to releasably retian the handle in either position.

Provision is made for guarding against inadvertent engagement of the ram feed mechanism when the clamping means is set. For this purpose the adjusting shaft 63 is provided with an extension 70 (Fig. 2) fitted with a cam 71 adapted to actuate a control device such as a switch 72 mounted within the housing 20. This switch may be interconnected in the headstock control system in well known manner to prevent engagement of the feed drive when the switch is actuated.

To extend the utility of the headstock, the underarm 35 is arranged so that it may be translated synchronously with the feed translation of the spindle, translated while the spindle remains stationary, or latched in retracted position while the spindle is translated as in conventional machine operations. In accordance with the invention the translation of the underarm is effected through the medium of a linearly movable member having a common feed drive with the ram 24.

In the exemplary headstock the arm driving member is in the form of an elongated bar 75 (Figs. 3, 6 and 7) slidably supported and guided in a longitudinally extending groove formed in the top plate 38 of the underarm 35. The upper face of the bar 75 is formed with rack teeth 77 meshing with a pinion 78 carried by a cross shaft 79 journaled in the housing 20. Preferably, a safety tooth 80 (Figs. 6 and 7) of the type shown in the Gallimore Patent No. 2,002,480, granted May 21, 1935, is provided at each end of the rack for limiting the translation thereof in each direction without disturbing the drive connection for effecting a return movement in the opposite direction.

As in headstocks of the type shown in the Gallimore Patent No. 2,251,015 hereinbefore referred to, the ram 24 is driven by a feed shaft 81 (Figs. 1 and 3) through the medium of a vertically disposed pinion shaft 82. In accordance with the invention, the speed change gearing 27 is interposed between the shaft 81 and the usual ram drive mechanism of the headstock as shown in Fig. 1. This may be a speed changer of any preferred type and, in the present instance, is adjustable by means of a hand lever 81' located on the front face of the headstock housing 20.

The vertical shaft 82 carries a pinion 83 meshing with a toothed rack 84 rigidly anchored in a longitudinal groove in one side of the feed ram 24. In the exemplary machine, the cross shaft 79, which constitutes the drive for the rack bar 75, is drivingly coupled with the ram drive shaft 82 by means of bevel gears 85. Accordingly, the rack bar 75 travels longitudinally in synchronism with the ram 24 and with the spindle 22 when the latter is drivingly coupled with the ram. While the arrangement shown provides a 1:1 driving ratio between the ram and the rack bar, it will be understood that other drive ratios may be employed if desired.

Since the rack bar 75 is mounted externally of the headstock housing 20 and the driving connection effected through the medium of the shaft 79, the housing may be sealed very easily to prevent leakage of lubricant therefrom. The sealing of the housing is additionally facilitated by the provision of suitable partitions to form a chamber 84' for the shaft 79 and gears 85 which is completely closed off from the main portions of the housing. A cover plate 85' bolted to the front face of the housing provides access to the chamber 84'.

Figure 6:
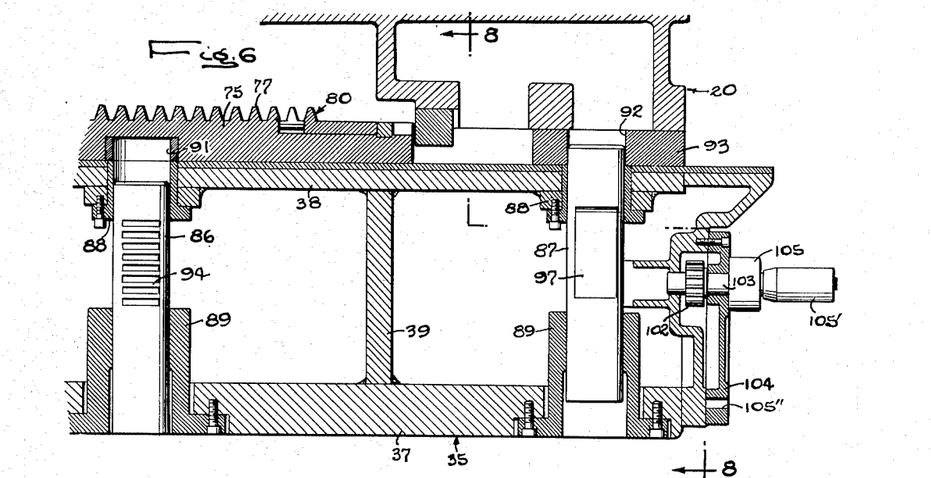
Fig. 6 is a fragmentary sectional view of the headstock and underarm taken in a vertical plane substantially on the line 6—6 of Fig. 3.
Figure 7:
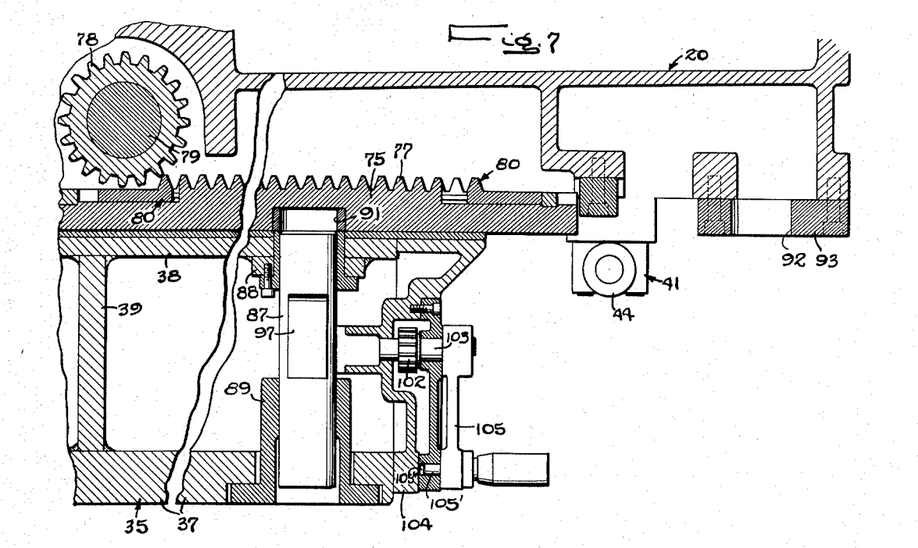
Fig. 7 is a fragmentary sectional view taken in the same plane as Fig. 6, but showing the underarm in a different position of adjustment.

Provision is made for latching the underarm 35 to the rack bar 75 for translation therewith or to disengage the underarm from the rack bar and latch it to the housing 20 so that the ram and spindle may be translated for conventional machining operations. The latching mechanism may be of any preferred character, and as shown in Figs. 3, 6, 7 and 9, comprises a pair of plungers 86 and 87 spaced apart longitudinally of the underarm and slidable vertically in upper and lower guide bearings 88 and 89 carried by the underarm. The upper end of the forward plunger 86 is adapted to be projected into either of two bushed sockets 90 (Fig. 3) and 91 (Figs. 6 and 7) opening in the underside of the rack bar 75 and spaced apart longitudinally thereof. The rear plunger 87 is adapted to be similarly projected to engage its upper end selectively in the rear socket 91 of the rack bar or in a socket 92 formed in a block 93 rigidly secured to the underside of the housing 20, as shown in Figs. 6 and 7.

Means is provided for alternately projecting one of the plungers 86 and 87 and retracting the other plunger. For this purpose the plunger 86 has one side formed with rack teeth 94 meshing with a pinion 95 on a rockshaft 96 journaled in and extending to the rear end of the underarm 35. The plunger 87 is recessed as at 97 in the corresponding side to afford clearance for the shaft 96 and the opposite side is formed with a rack 98 meshing with a pinion 99 on a rockshaft 100 also journaled in and extending to the rear end of the underarm 35.

The plunger actuating shafts 96 and 100 are thus disposed in parallel relation and are spaced apart laterally of the underarm. Each shaft is provided with a gear 101 meshing with a pinion 102 on a rockshaft 103 disposed between the plunger actuating shafts and journaled in the underarm and in a cover plate 104 mounted on the end thereof. It will be apparent that the above mechanism provides for rocking the plunger actuating shafts 96 and 100 simultaneously to either project or retract their associate plungers in response to the rocking of the shaft 103.

Figure 8:
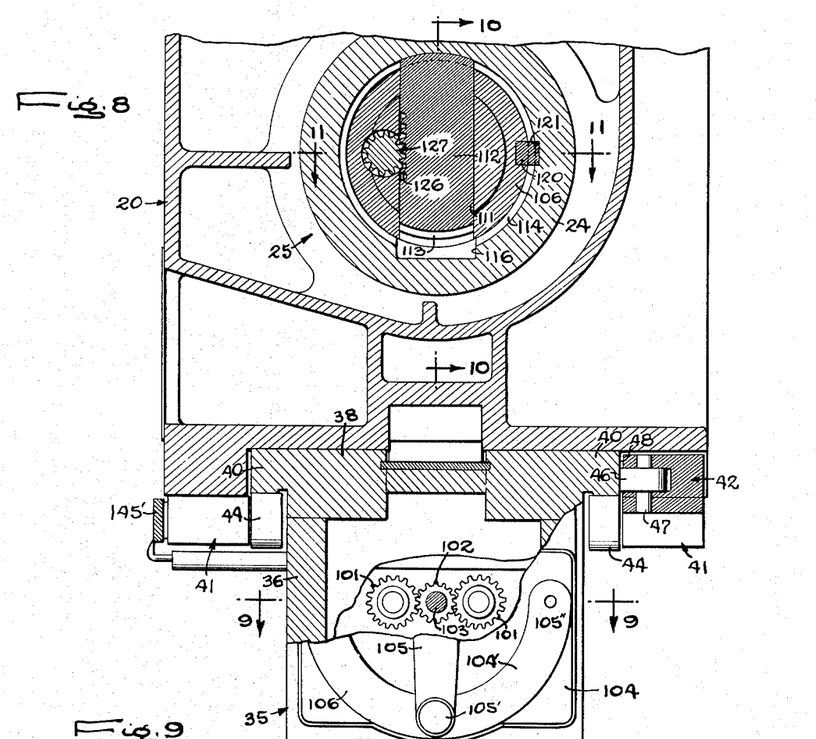
Fig. 8 is a transverse sectional view of the headstock and underarm taken in offset vertical planes substantially on the line 8—8 of Fig. 6.
Figure 9:
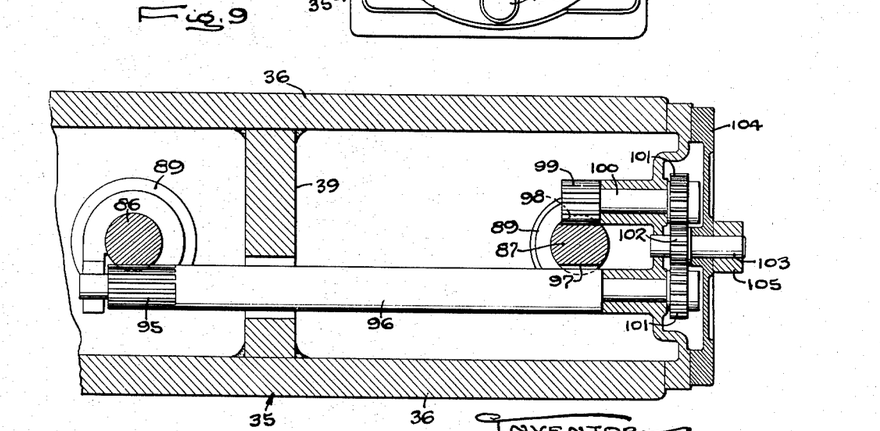
Fig. 9 is a fragmentary sectional view of the underarm taken in a horizontal plane substantially on the line 9—9 of Fig. 8.

The shaft 103 is arranged to extend through the cover plate 104 and its projecting end is fitted with an actuating lever 105 adapted to swing over a guide sector 104' formed on the outer face of the cover plate. The arrangement is such that when the lever 105 occupies the central or neutral position in which it is shown in Fig. 8, both plungers will be located in an intermediate position with their upper ends retracted from the sockets with which they cooperate. The underarm is thus disengaged from the rack bar 75 and from the housing 20 so that it may be relatively adjusted with respect to the housing 20. When the lever 105 is swung counterclockwise as viewed in the drawing, plunger 87 is projected into latching position and plunger 86 is further retracted. Swinging of the lever 105 clockwise from the neutral position projects the plunger 86 and retracts the plunger 87. Conventional detent means 105' carried by the arm 105 and cooperating with locating indentations 105'' in the guide sector serves to hold the lever in any of the three positions of adjustment.

The provision of the two spaced sockets in the rack bar 75 permits the underarm 35 to be coupled in driving relation to the ram either with its forward end portion extended beyond the nose of the spindle or substantially flush with the spindle. In the first-mentioned position the underarm is capable of supporting various types of fixtures or attachments having elements to be rotatably driven by the spindle. In the latter position the underarm may be utilized for supporting planing or shaping fixtures. In either instance the full range of travel of the bar 75 may be utilized to advantage in translating the underarm.

When the headstock is used for planing or shaping operations, the rotational driving action of the spindle is not required and consequently translation of the spindle with the underarm serves no useful purpose. To avoid the unnecessary work of translating the spindle under such conditions and to reduce wear on the spindle, the invention provides the novel coupling means 25 hereinbefore referred to, whereby the spindle 22 may be drivingly connected with the feed ram or disconnected therefrom and locked in a fixed position while the ram is freed for independent translation. While in the present instance such independent translation of the ram is utilized for translating the underarm, it will be appreciated that it is not limited to this particular service, but may be utilized for driving any type of linearly translatable element with which the headstock may be equipped.

Figure 10:
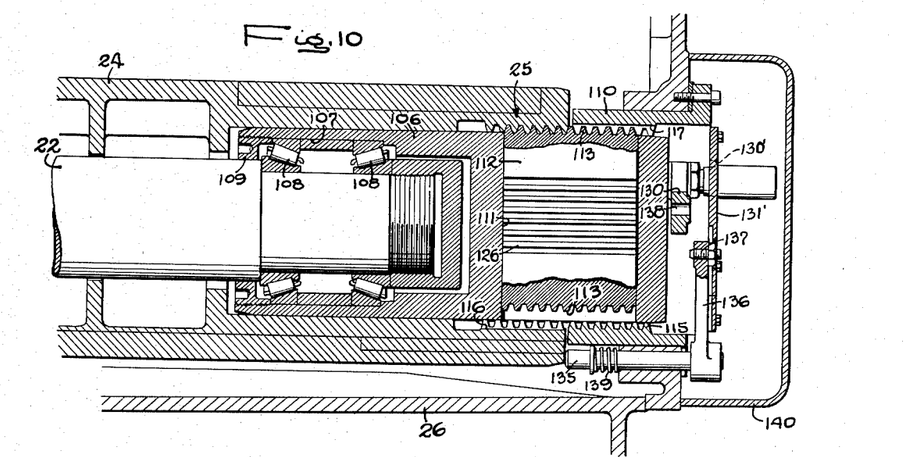
Fig. 10 is a fragmentary sectional view of the headstock taken in a vertical plane substantially on the line 10—10 of Fig. 8.
Figure 11:
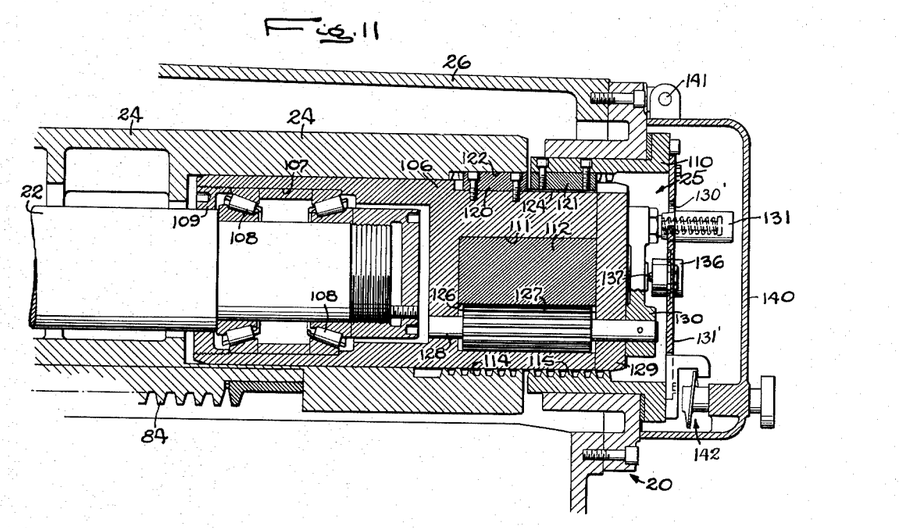
Fig. 11 is a fragmentary sectional view of the headstock taken in a horizontal plane susbtantially on the line 11—11 of Fig. 8.

Referring now to Figs. 10 and 11 of the drawings, the coupling means 25 as herein shown includes a coupling member 106 of generally cylindrical form slidably mounted in the rear end of the ram 24, which may be of tubular construction or formed with a suitable bore for the accommodation of the member. At its forward end the member 106 has a bore 107 for the reception of the inner end of the spindle 22 and the latter is anchored thereto by antifriction bearings 108 confined between an internal shoulder in the member and a nut 109 threaded therein. The spindle 22 is thus rotatable relative to the member 106 but is movable axially only with the member.

Mounted on the housing 20 at the rear of and axially alined with the ram 24 is a tubular bracket 110 having an internal diameter such that the coupling member 106 may be slidably received therein. As will be seen by reference to the drawings, the member 106 is arranged to extend substantially beyond the end of the ram 24 and to project into the bracket 110 when the ram is in retracted position.

Slidably mounted in a diametrical slot 111 in the coupling member 106 is a key element 112 of generally rectangular cross section and of a length somewhat less than the diameter of the coupling member. Each end of the key element is formed with an arcuate surface of the same radius as the internal surface of the ram and bracket 110 and the end surfaces are grooved to provide a series of teeth 113 uniformly spaced apart longitudinally of the coupling member.

For cooperation with the key element 112, the ram 24 and the bracket 110 are formed respectively with a series of internal annular ridges or teeth 114 and 115 defined, in this instance, by circumferential grooves. These teeth are spaced apart axially of the ram and bracket for interlocking engagement with the teeth 113 with the key element.

In the exemplary headstock the teeth 114 are interrupted at one side of the ram, preferably the lower side, by an axially extending groove 116 (Figs. 8 and 10) of a width adapted to accommodate the key 112. Accordingly, when the key element is shifted downwardly from the position shown in Fig. 10, the teeth 113 of the key element interlock with the teeth 115 of the bracket 110 and effectually lock the spindle 22 thereto. The ram 24, however, is free to move axially since the groove 116 provides clearance for the key element.

A longitudinally extending groove 117 located diametrically opposite the groove 116 and in alinement with the opposite end of the key element interrupts the teeth 115 of the bracket 110 to provide clearance for the key element when it is shifted so as to interlock its teeth 113 with the teeth 114 of the coupling member. Accordingly, the coupling member and spindle are locked and constrained to move axially with the ram while the key element slides along the groove 117.

Figure 3:
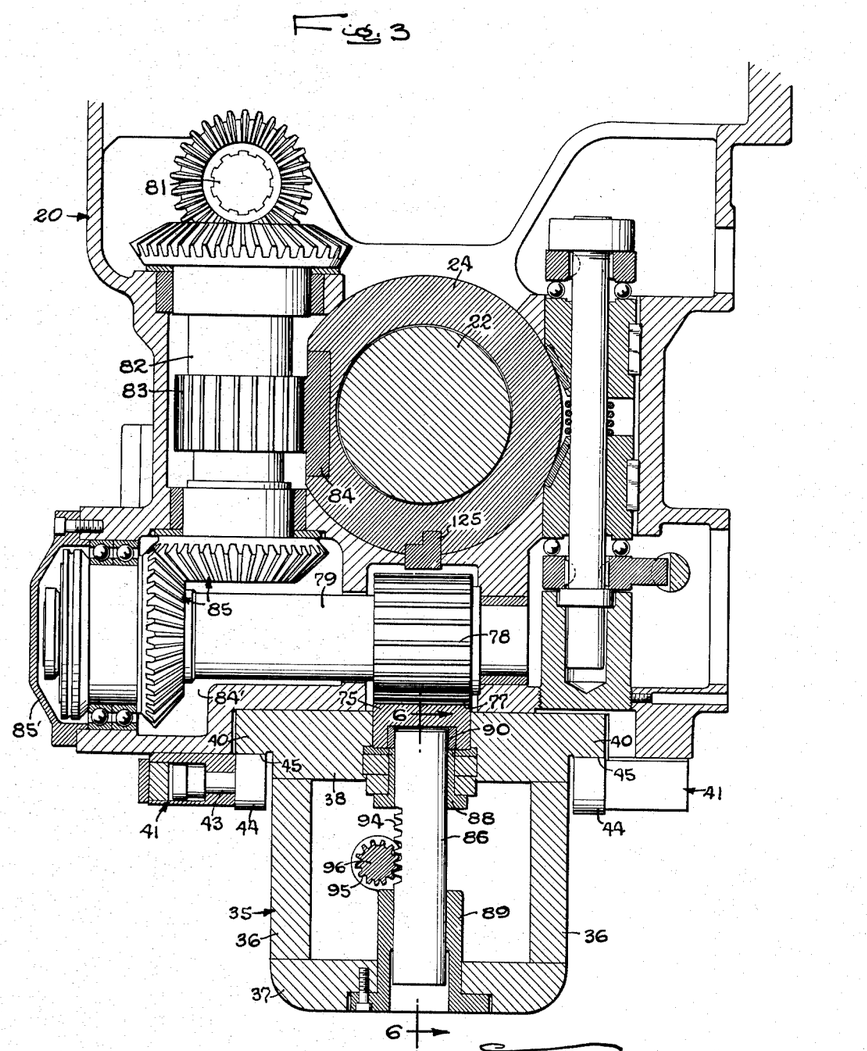
Fig. 3 is a transverse sectional view of the headstock taken in a vertical plane substantially on the line 3—3 of Fig. 1.

In order to insure accurate alinement of the key element 112 with the grooves 116 and 117 at all times, provision is made for restraining the coupling member 106 against rotation whether locked to the ram 24 or to the bracket 110. In the present instance this is accomplished by a pair of keys 120 and 121 (Fig. 11). The key 120 as shown is secured to the coupling member and positioned to engage in a keyway 122 formed in the ram 24. The key 121, on the other hand, is secured to the bracket 110 so as to engage in a keyway 124 in the coupling member. It will be understood of course that the ram 24 is conventionally restrained from rotation as by a key 125 (Fig. 3).

Any suitable means may be utilized for actuating or shifting the key element 112 to lock the coupling member selectively to the ram 24 or to the bracket 110. In the exemplary embodiment, the key element 112 is formed on one face with rack teeth 126 (Figs. 8 and 11) meshing with a pinion 127 carried by a shaft 128. This shaft is journaled at opposite ends in the coupling member 106 and in an end plate 129 rigidly secured thereto. A lever 130 fixed on the projecting end of the shaft and having a handle 131 at its free end provides for manual rotation of the shaft.

The handle 131 is arranged to project through an arcuate slot 130' in a guard plate 131' secured to and closing the rear end of the bracket 110. As the spindle and coupling member are advanced from retracted position, the handle 131 is drawn through the slot 130' and rendered inaccessible, thus guarding against inadvertent release of the coupling member from the ram under such conditions.

Withdrawal of the key element 112 from latching engagement with the bracket 110 when the ram is in an advanced position is prevented by a latch mechanism comprising, in this instance, a plunger 135 (Fig. 10) slidably mounted on the housing 20 and projecting at the rear end thereof. The plunger is provided at its projecting end with a laterally extending arm 136 carrying a latch pin 137 adapted to enter a hole 138 in the actuating lever 130 when the latter is rocked to a position to lock the coupling member to the bracket. A spring 139 yieldably urges the plunger 135 forwardly or in a direction to enter the locking pin. However, the inner end of the plunger 135 is positioned in the path of the ram 24 which pushes the plunger rearwardly and renders the unlocking pin ineffective as the ram is moved into retracted position. Upon advance of the ram the plunger and associated elements of the latch mechanism are advanced by the spring 139 to latching position.

In the exemplary headstock the spindle lock actuating mechanism is enclosed by a protective cover 140. This cover is mounted on the housing 20 by means of a hinge 141 and suitable latch means 142 is provided for maintaining it in closed position.

Figure 12:
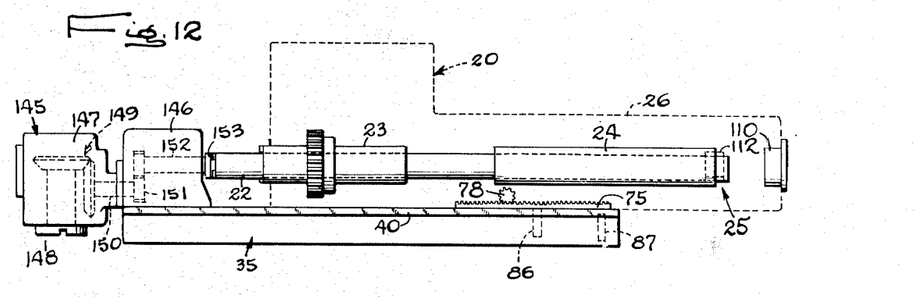
Fig. 12 is a skeletonized side view of the headstock, showing the underarm utilized to support an angle milling attachment.

The forward end of the underarm 35 is constructed for operative association with any one of various types of tools, tool fixtures or cutting attachments. Fig. 12 illustrates one form of milling attachment 145 supported by the underarm for rotary drive by the spindle 22. In this instance the underarm is projected substantially beyond the nose end of the spindle and is connected in driving relation with the rack bar 75 by means of the locking plunger 86. To facilitate the positioning of the underarm a scale bar 145' is provided on the housing 20 for cooperation with suitable indicia on the underarm. The bar is preferably graduated with two separate scales having their respective indicia coordinated with the two connecting sockets of the rack bar.

The particular attachment shown has a housing 146 adapted to be bolted or otherwise rigidly secured to the top face of the underarm. A swivel head 147 mounted on the housing 146 for angular adjustment about an axis parallel to the spindle axis rotatably supports a transverse auxiliary tool spindle 148. The auxiliary tool spindle is connected for rotary drive through bevel gears 149 with an intermediate shaft 150, which in turn is connected through suitable gearing 151 with a shaft 152 alined axially with the spindle 22. The shaft 152 projects at the rear of the housing and, in this instance, into abutting relation to the nose of the spindle 22. Cooperating clutch teeth 153 on the shaft and spindle provide a rotary driving connection therebetween.

It will be evident that in the above set-up the underarm 35 affords rigid support for the attachment 145 movable with the headstock spindle 22 so that the attachment may be located for operation in any extended position from the headstock housing 20 throughout the range of spindle travel. The rigid support thus provided permits the use of larger cutters with the attachment and enables heavier cuts to be taken without adverse effect on the accuracy or machining operation performed.

Figure 13:
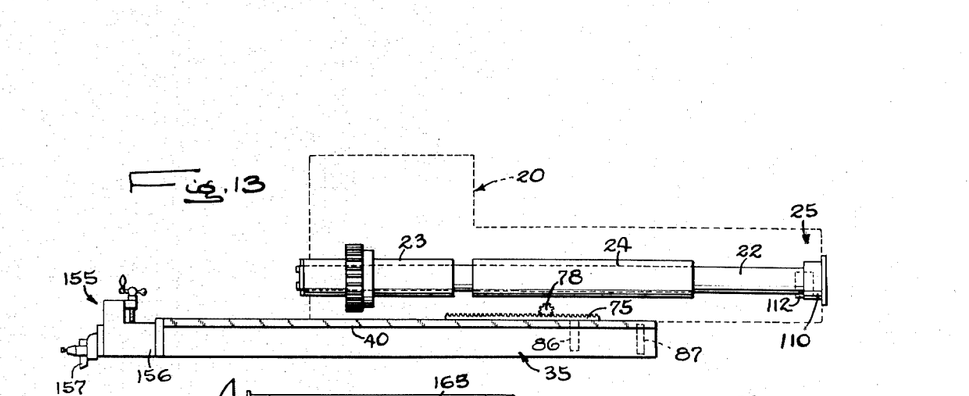
Fig. 13 is a view similar to Fig. 12, but showing the underarm arranged to support a shaping attachment.

Fig. 13 illustrates a shaping attachment 155 mounted on the underarm 35. In this instance the attachment is secured to the end face of the underarm, thus reducing over-all clearance requirements so that the attachment may be operated in openings of relatively small dimensions. The attachment 155 shown has a body 156 with a transverse guideway on its outer end face for an adjustable tool slide 157.

When operating with the shaping attachment 155 or with other attachments or fixtures requiring only linear translation and intermittent transverse feed, the underarm is connected with the rack bar by either of the plungers 86 or 87, depending upon the particular range of ram travel to be utilized. The headstock spindle 22 is disconnected from the ram 24 and locked to the housing 20 by means of the locking mechanism 25. The underarm and attachment are thus adapted to be reciprocated by the ram 24 while the spindle 22 remains stationary.

To facilitate the performance of shaping and similar machining operations, the headstock may be equipped with appropriate control devices for controlling the direction and extent of movement of the ram 24. Thus, as shown in Fig. 1, suitable limit switches 160 and 161 may be mounted on the headstock housing 20 for alternate operation by dogs 162 and 163 movable with the underarm. In the particular embodiment illustrated, the dogs are adjustably mounted in a guide slot 164 extending longitudinally of the underarm and may be independently adjusted to determine the length and the limits of the reciprocatory stroke of the ram and underarm.

Figure 14:
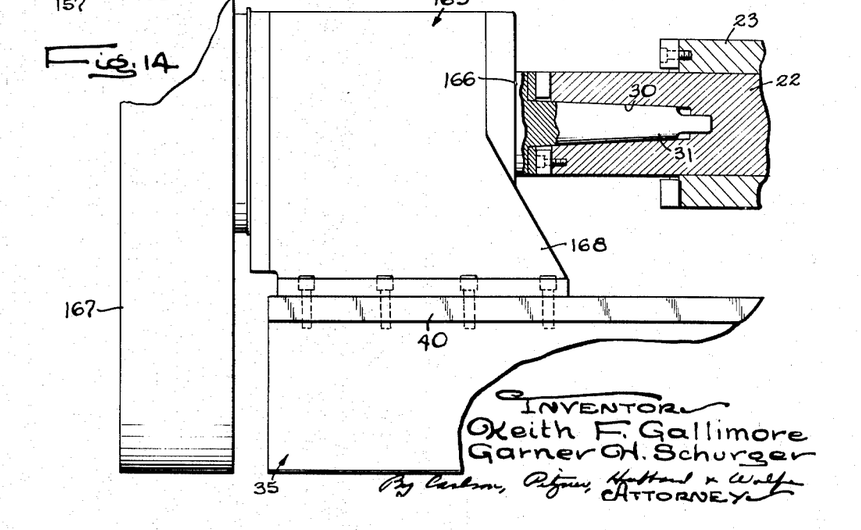
Fig. 14 is a fragmentary side view of the spindle and underarm showing the latter arranged to support an attachment for performing face milling operations.

Fig. 14 illustrates the use of the underarm 35 for supporting a guide and bearing housing 165 for an auxiliary or extension spindle 166. In this instance a large facing head 167 is mounted on the forward end of the auxiliary spindle and the latter is drivingly secured to the headstock spindle 22 by the tapered shank 31 engaging in the socket 30, as hereinbefore described. The guide and bearing housing 165 includes a mounting bracket 168 adapted to be bolted to the top face of the underarm. In this arrangement the headstock spindle 22 may be projected to extend the auxiliary spindle and the cutter 167 a considerable distance from the headstock housing and the underarm 35 will afford adequate support in all positions of adjustment or translation to insure the rigidity necessary for heavy duty machining operations.

It will be apparent from the foregoing that the invention provides a spindle headstock of novel and advantageous construction in which various tools, tool fixtures and tool attachments may be supported independently of the spindle to be translated in synchronism with the spindle and rotatably driven thereby, or for translation independently thereof. Excessive strains on the spindle are thus avoided and lateral flexure of the spindle is eliminated so as to afford adequate support for the tools, fixtures and attachment for heavy duty machining operations in any position throughout the range of spindle travel.

The invention also provides novel means by which the headstock spindle may be disengageably coupled with the driving ram for translation thereby or locked to the headstock housing while the ram is freed for independent translation. The utility of the headstock is thereby materially increased since the ram may be utilized to provide the linear drive requiredf or shaping or planing attachments carried by the auxiliary supporting structure such as an underarm. This eliminates the work of translating the spindle, reduces spindle wear and, moreover, reduces overhead clearance requirements for the shaping attachment so that it may be used in relatively small openings. In general, therefore, it will be apparent that the novel construction provided by the invention materially extends the utility of the headstock both with respect to the types of machining operations for which it may be used and to the accuracy with which such operation may be performed.

We claim as our invention:

1. In a spindle headstock, in combination, a housing, a spindle mounted in said housing for rotation and for projected axial translation, an elongated supporting member of generally rectangular cross-section slidably mounted on said housing below and spaced from the spindle for longitudinal translation parallel to said spindle, said member having means on its top face for supporting a tool element adjacent the projecting end of the spindle and in driving relation thereto, a feed shaft journaled in said housing, and separately engageable and disengageable drive connections from said shaft for translating said spindle and said suporting member either independently or in synchronism.

2. In a spindle headstock, in combination, a housing, a spindle mounted in said housing for rotation and for projected axial translation, a driving member supported externally of said housing for translation parallel to said spindle, drive means for translating said spindle and said member in synchronism, an elongated supporting member slidably mounted on said housing for longitudinal translation parallel to said spindle, said supporting member having its forward end shaped for supporting a tool element in position to be rotatably driven by said spindle, and manually operable latch means mounted on said supporting member and settable selectively to connect said supporting member with said drive member for translation therewith or to disconnect the supporting member from said drive member and lock it to said housing.

3. In a spindle headstock, in combination, a housing, a spindle mounted in said housing for rotation and for projected axial translation, a driving member supported externally of said housing for translation parallel to said spindle, drive means for translating said spindle and said member in synchronism, an elongated supporting member slidably mounted on said housing for longitudinal translation parallel to said spindle, said supporting member having its forward end shaped for supporting a tool element in position to be rotatably driven by said spindle, and a pair of plungers carried on said supporting member and adapted to be projected therefrom alternatively, said drive member and said housing having sockets for the reception of said plungers when projected whereby said supporting member may be connected for translation with the spindle or locked in a fixed position.

4. In a spindle headstock, in combination, a housing, a ram mounted in said housing for axial translation, a spindle mounted in said housing for rotation and for axial translation, an elongated supporting member slidably mounted on said housing for longitudinal translation parallel to said spindle, said member having its forward end shaped for supporting a tool element adjacent the projecting end of the spindle, drive means for translating said ram and said supporting member in synchronism, and means operable selectively to couple said spindle to said ram for translation thereby or to free the ram and said supporting member for translation while said spindle is stationary.

5. In a spindle headstock, in combination, a housing, a ram mounted in said housing for axial translation, a spindle mounted in said housing for rotation and for axial translation, an elongated supporting member slidably mounted on said housing for longitudinal translation parallel to said spindle, said member having its forward end shaped for supporting a tool element adjacent the projecting end of the spindle, drive means for translating said ram and said supporting member in synchronism, and means operable selectively to couple said spindle with said ram for translation thereby or to lock said spindle in a fixed position and free said ram and said supporting member for independent translation.

6. In a spindle headstock, in combination, a housing, a spindle mounted in said housing for rotation and for projected axial translation, a ram for translating said spindle, drive means for said ram, said housing enclosing said ram and said drive means and defining a chamber for retaining lubricating oil, a member slidably supported and guided on said housing for translation parallel to said spindle, said member being operative to support a tool element adjacent the projecting end of the spindle, and a connection from said ram drive means to said supporting member for translating the member in synchronism with said ram, said connection including a shaft extending from said housing through a bearing effective to prevent leakage of oil from said housing.

7. In a spindle headstock, in combination, a housing, a spindle mounted in said housing for rotation and for projected axial translation, an elongated supporting member slidably mounted on said housing for longitudinal translation parallel to the axis of said spindle, means on said member for supporting a tool element adjacent one end of said spindle, a pair of drive members supported for translation in paths parallel to the axis of said spindle, drive means for translating said drive members in synchronism, latch means disengageably connecting one of said drive members with said spindle, and other latch means disengageably connecting the other of said drive members with said supporting member.

8. In a spindle headstock, in combination, a housing, a spindle mounted in said housing for rotation and for projected axial translation, an elongated supporting member slidably mounted on said housing for longitudinal translation parallel to the axis of said spindle, means on said member for supporting a tool element adjacent one end of said spindle, a pair of drive members supported for translation in paths parallel to the axis of said spindle, drive means for translating said drive members in synchronism, latch means operable selectively to connect said spindle with one of said drive members for translation thereby or to lock the spindle in a fixed position in said housing and free said one member for translation independently of the spindle, and other latch means operable to disengageably connect the other of said drive members with said supporting member.

9. In a spindle headstock, in combination, a housing, a spindle mounted in said housing for rotation and for projected axial translation, an elongated supporting member slidably mounted on said housing for longitudinal translation parallel to the axis of said spindle, means on said member for supporting a tool element adjacent one end of said spindle, a pair of drive members supported for translation in paths parallel to the axis of said spindle, drive means for translating said drive members in synchronism, latch means disengageably connecting one of said drive members with said spindle, and other latch means operable selectively to connect said supporting member with the other of said drive members for translation thereby or to lock the supporting member in a fixed position relative to said housing and free the other drive member for reciprocation independently of said supporting member.

10. In a spindle headstock, in combination, a housing, a spindle mounted in said housing for rotation and for projected axial translation, an elongated supporting member slidably mounted on said housing for longitudinal translation parallel to the axis of said spindle, means on said member for supporting a tool element adjacent one end of said spindle, a pair of drive members supported for translation in paths parallel to the axis of said spindle, drive means for translating said drive members in synchronism, latch means operable selectively to connect said spindle with one of said drive members for translation thereby or to lock the spindle in a fixed position in said housing and free said one member for translation independently of the spindle, and other latch means operable to connect said supporting member with the other of said drive members for translation thereby, said other latch means being further operable to lock said supporting member in a fixed position relative to the housing and to free said other drive member for translation independently of said supporting member.

11. In a spindle headstock, in combination, a housing, a spindle mounted in said housing for rotation and for projected axial translation, an elongated supporting member slidably mounted on said housing for longitudinal translation parallel to the axis of said spindle, means on said member for supporting a tool element adjacent one end of said spindle, a pair of drive members supported for translation in paths parallel to the axis of said spindle, drive means for translating said drive members in synchronism, a first latch means connecting one of said drive members with said spindle, a second latch means connecting the other of said drive members with said supporting member, each of said latch means being disengageable to free the drive members for reciprocation independently of the associated connecting parts, and means for restraining said first latch means against disengagement when said first drive member and said spindle are in any but a fully retracted position.

References Cited in the file of this patent

UNITED STATES PATENTS

| | | |
|---|---|---|
| 1,167,648 | Morton | Jan. 11, 1916 |
| 1,269,727 | Metz | June 18, 1918 |
| 1,908,478 | Eisele | May 9, 1933 |
| 2,027,385 | Kraut et al. | Jan. 14, 1936 |
| 2,052,249 | Roehm | Aug. 25, 1936 |
| 2,111,096 | Fritzsch | Mar. 15, 1938 |
| 2,345,060 | Morton | Mar. 28, 1944 |
| 2,430,677 | Hobart | Nov. 11, 1947 |
| 2,438,235 | Strom | Mar. 23, 1948 |
| 2,449,327 | Schlitters | Sept. 14, 1948 |
| 2,449,449 | Bugatti | Sept. 14, 1948 |
| 2,499,193 | Lochman | Feb. 28, 1950 |
| 2,620,710 | Gallimore et al. | Dec. 9, 1952 |